(12) United States Patent
Ritter

(10) Patent No.: US 6,628,278 B1
(45) Date of Patent: Sep. 30, 2003

(54) METHOD FOR OBTAINING A THREE-DIMENSIONAL MAP REPRESENTATION, AND A NAVIGATION SYSTEM

(75) Inventor: Dieter Ritter, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/577,063

(22) Filed: May 22, 2000

(30) Foreign Application Priority Data

May 21, 1999 (EP) .......................................... 99110003

(51) Int. Cl.⁷ .............................................. G06T 15/00
(52) U.S. Cl. ..................................................... 345/419
(58) Field of Search ................................ 345/419, 427, 345/421, 581, 619, 425

(56) References Cited

U.S. PATENT DOCUMENTS

| | | | |
|---|---|---|---|
| 4,490,972 A | 1/1985 | Ellion et al. | 60/39 |
| 4,667,190 A | 5/1987 | Fant | 340/747 |
| 4,847,788 A * | 7/1989 | Shimada | 364/522 |
| 6,169,552 B1 * | 1/2001 | Endo et al. | 345/427 |

FOREIGN PATENT DOCUMENTS

| | | |
|---|---|---|
| EP | 0378271 A1 | 7/1990 |
| EP | 0579451 A1 | 1/1994 |
| EP | 0752687 A2 | 1/1997 |
| EP | 0841537 A2 | 5/1998 |

* cited by examiner

Primary Examiner—Phu K. Nguyen
(74) Attorney, Agent, or Firm—Laurence A. Greenberg; Werner H. Stemer; Ralph E. Locher

(57) ABSTRACT

In a method for obtaining a three-dimensional map representation for a navigation system from two-dimensional road map data, road segments to be represented are linked with the aid of three-dimensional topological data. The navigation system has a conversion unit for converting the two-dimensional road map data and the three-dimensional road topological data into a three-dimensional map representation.

9 Claims, 8 Drawing Sheets

METHOD FOR OBTAINING A THREE-DIMENSIONAL MAP REPRESENTATION, AND A NAVIGATION SYSTEM

BACKGROUND OF THE INVENTION

Field of the Invention

The invention relates to a method for obtaining a three-dimensional map representation for a navigation system from digital, two-dimensional road map data, and to a navigation system having a three-dimensional map representation.

Digital road maps for navigation systems regularly contain two-dimensional networks of road segments and nodes connecting the road segments. The nodes are assigned geocoordinates that are defined in each case by degrees of longitude and latitude.

Published, European Patent Application EP 0 752 687 A2 discloses a three-dimensional representation from a bird's-eye perspective for navigation systems, in the case of which the transformation of the digital road map data into the bird's-eye perspective is optimized by use of conversion tables. The representation of the road map is performed by a perspective projection that is performed from a virtual, elevated viewpoint. The result is to produce a pseudo-3D effect that causes the plane to run together into a vanishing point.

Thus, no actual three-dimensional information is used, but the plane is still flat.

Published, European Patent Application EP 0 841 537 A2 discloses a navigation system which permits a three-dimensional map representation. Topographic features, roads and buildings are stored for this purpose as three-dimensional data. It is very expensive to set up such a database. The complete database has to be set up anew in the event of changes in road information. Conventional two-dimensional digital road maps for which there are relatively cost-effective new editions at regular intervals cannot easily be taken over.

SUMMARY OF THE INVENTION

It is accordingly an object of the invention to provide a method for obtaining a three-dimensional map representation, and a navigation system that overcome the above-mentioned disadvantages of the prior art methods and devices of this general type, which permit a three-dimensional map representation on the basis of two-dimensional, digital road map data.

With the foregoing and other objects in view there is provided, in accordance with the invention, a method for obtaining a three-dimensional map representation for a navigation system from digital, two-dimensional road map data of a road map database having a network of road segments, which includes linking the road segments to be represented with an aid of three-dimensional topological data of a separate geotopology database resulting in display data; and subsequently outputting the display data onto a display device.

The road segments of the two-dimensional road map database are linked with the aid of three-dimensional, topological data of a geotopology database and are thus incorporated into the three-dimensional structure of the topological data. The result is a true three-dimensional view that reproduces height differences in terrain. The same procedure can be adopted with all other objects, for example water bodies, forest and the like, present in the two-dimensional road map database.

An artificial elevation of objects, that is to say multiplication of the z-coordinate (height) by a factor >1, can strengthen the 3D impression. This brings out, for example, hills and valleys more strongly in visual perception.

The road map data of the two-dimensional road map database have a network of road segments with nodes or points of intersection. The nodes or points of intersection define the road segments. Each node is stored as a geodatum or geocoordinate, typically in degrees of longitude and latitude or in Cartesian coordinates. The three-dimensional topological data from the geotopology database can be determined in each case for the nodes of a road segment that is to be reproduced on the display device. In accordance with an added feature of the invention, there are the steps of connecting the road segments to one another at nodes, the nodes being assigned geocoordinates in the road map database and associated points of the three-dimensional topological data are determined for the nodes of the road segments to be output; and plotting the road segments between the associated points determined in the topological data.

If no appropriate point for a node is stored in the geotopology database, the three-dimensional topological data can be determined by interpolation. Use is made for this purpose of those three-dimensional topological data that come closest to the geocoordinate of the relevant node.

Although the road map database and the geotopology database can be accommodated on a single data medium, separate data media are preferred for the databases. In particular, the databases can be stored on different CD-ROMs which are read as required by a CD changer.

As an option, it is also possible to provide a database for textures for describing the surfaces of the topographies to be represented and for describing discrete, three-dimensional objects. In this way, it is possible, for example, to generate realistically with a suitable surface structure and color, forest and meadow sections of a landscape, or buildings. In accordance with an additional feature of the invention, there are the steps of assigning textures stored in a texture database and have a raster of the geocoordinates to go the three-dimensional topological data; and assigning objects to the three-dimensional topological data in accordance with the geocoordinates as three-dimensional geometrical bodies.

Road segments are preferably provided with boundary lines so that a road segment is firstly given a two-dimensional appearance. Subsequently, the boundary lines are distorted into a bent coarse in the region of juxtaposed road segments. This produces a particularly natural view without edges in the line of the road or at junctions, above all in the case of intense enlargement of a map section.

In a preferred embodiment, there is an alteration between a three-dimensional representation that is based on the geotopology database, and a three-dimensional representation that is based only on the two-dimensional road map data. For the latter representation, it is in each case only road map data for a field of view to be represented that are prepared with a predetermined visual range for a task. In this case, the field of view to be represented is preferably bent in a radially symmetric fashion about a virtual viewpoint by a polynomial transformation. The result is an artificial horizon. The plane to be represented is distorted like a dish.

There is preferably a switchover to the representation based only on the road map data in towns/cities or in the case of map representations for very great enlargement in which the emphasis is on the guiding information for a delimited area, for example a road intersection or a complicated juxtaposition of streets. The topographic data are frequently of lesser value in any case in the downtown area.

In accordance with another feature of the invention, there is the step of using the navigation system to continuously determine the virtual viewpoint, and displacing the field of view synchronously with the virtual viewpoint.

With the foregoing and other objects in view there is provided, in accordance with the invention, a navigation system, containing a display device; a position-determining unit; at least one storage medium for storing a road map database with two-dimensional road map data of a network of road segments; and a conversion unit receiving and converting the road segments of the two-dimensional road map database and three-dimensional topological data of a geotopology database into a three-dimensional road map representation. The conversion unit is connected to the display device for displaying the three-dimensional road map representation.

Other features which are considered as characteristic for the invention are set forth in the appended claims.

Although the invention is illustrated and described herein as embodied in a method for obtaining a three-dimensional map representation, and a navigation system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
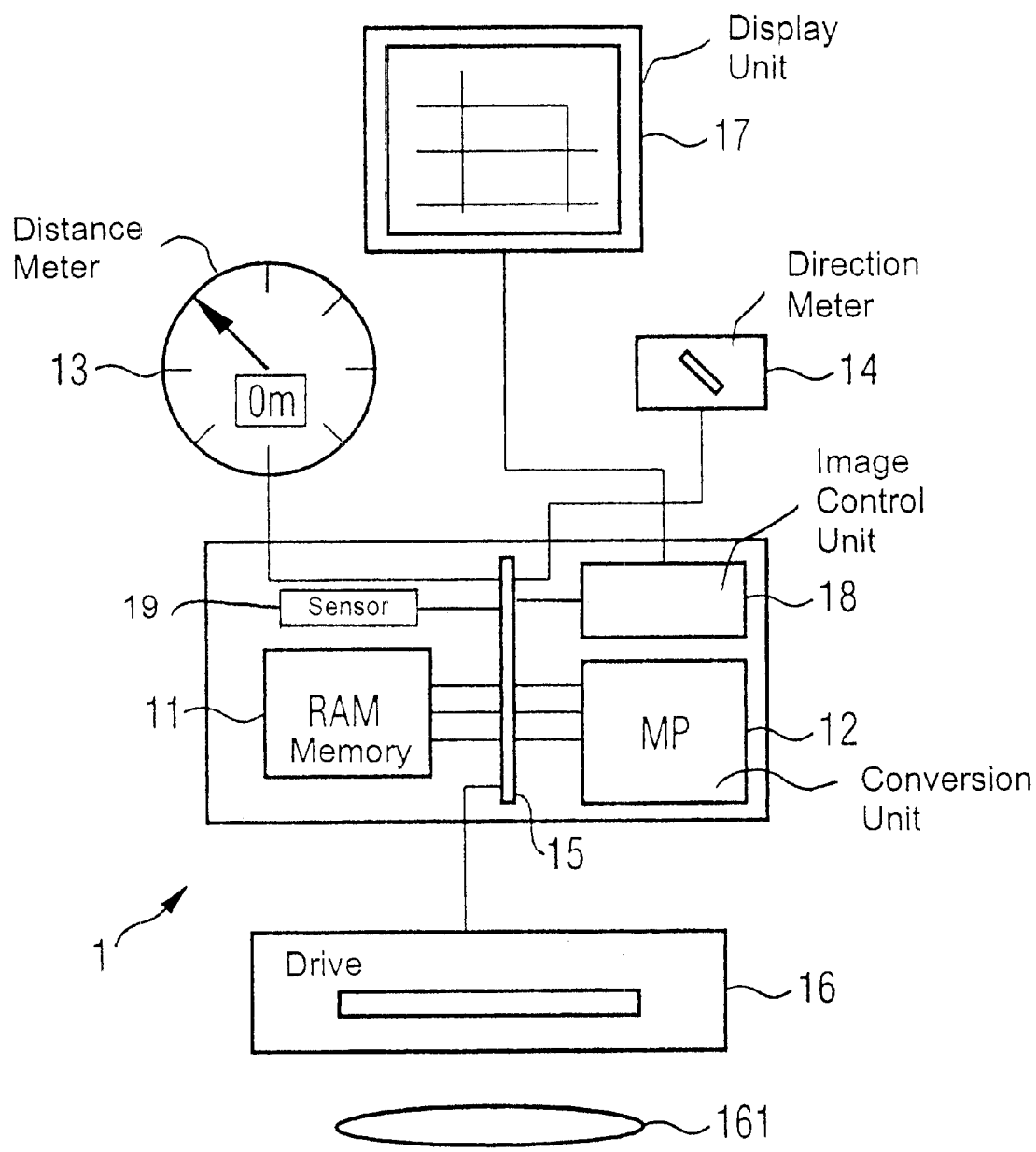
FIG. 1 is a block diagram of a navigation system according to the invention.

In all the figures of the drawing, sub-features and integral parts that correspond to one another bear the same reference symbol in each case. Referring now to the figures of the drawing in detail and first, particularly, to FIG. 1 thereof, there is shown a navigation system 1 having a main memory 11 and a conversion unit 12 constructed as a microprocessor. A distance meter 13 and a direction meter 14 serve for determining a position via dead reckoning. Just like the distance meter 13, the direction meter 14 and a drive 16 for a memory medium 161, a global positioning satellite (GPS) sensor 19 is connected to the microprocessor 12 via a system bus 15.

The memory medium 161 is a digital versatile disk (DVD). The drive can receive a plurality of DVDs simultaneously. A DVD contains a road map database, a further DVD (not illustrated) contains a topology database and a further DVD contains a texture database with surface characteristics for the topographies to be represented, and of discrete, three-dimensional objects.

A display device 17 is controlled via an image control unit 18 for outputting image information and, in particular, for representing road maps. The image control unit 18 is connected, in turn, to the microprocessor via the system bus 15.

Figure 2:
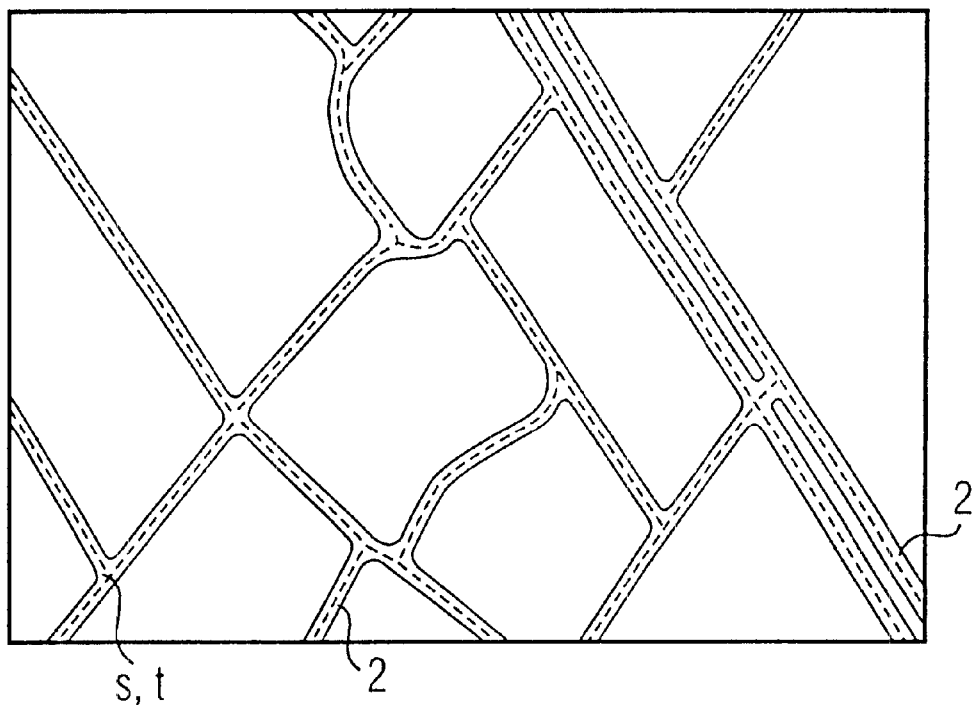
FIG. 2 is an illustration of a section from a road map database with a network of road segments.

FIG. 2 illustrates two-dimensional road map data of a road map database, which are to be displayed for a user of the navigation system 1. The road maps contain road segments 2 that are represented two-dimensionally as roads.

The road segments 2 are defined by two-dimensional geocoordinates in the form of nodes or points of intersection, at which roads intersect, and of shape points which represent a curve profile. The road segments are connecting lines between the nodes and/or the shape points.

The positions of the nodes and the shape points are stored as two-dimensional road map data s, t.

Figure 3:
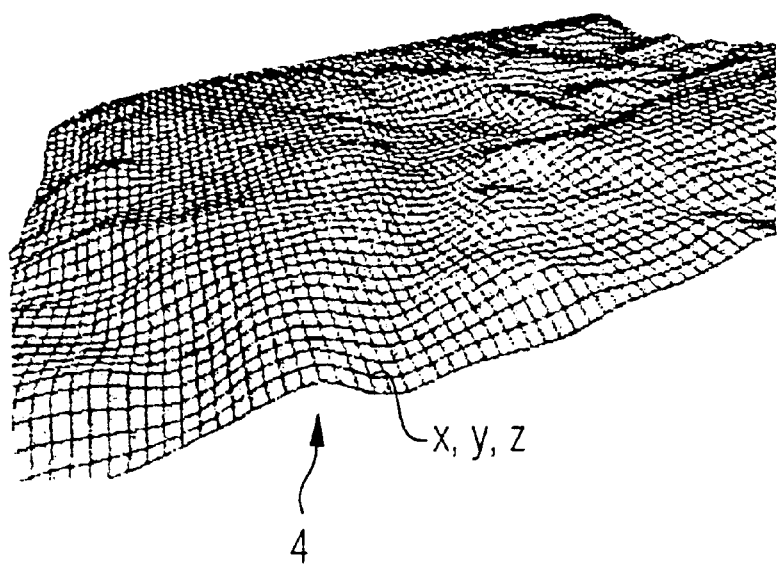
FIG. 3 is an illustration of a representation of a three-dimensional topological data relating to a surface shown in FIG. 2.

FIG. 3 shows topology data 4, represented in the form of a grid, such as are provided, for example, by aerial or satellite-supported geodesy. The lattice points of the network are stored as three-dimensional coordinates x, y, z. The topology data reproduce the three-dimensional characteristics of the relevant terrain. The data therefore give expression to ridges, valleys and other terrain contours.

The terrain contours are represented with particular intensity when objects such as hills and valleys are artificially heightened. This can be accomplished in each case by multiplying the corresponding coordinate, which is responsible for the representation of height (z coordinate), by a factor >1. A good spatial impression that is even more natural results for a factor of between 1.2 and 1.8.

Figure 4:
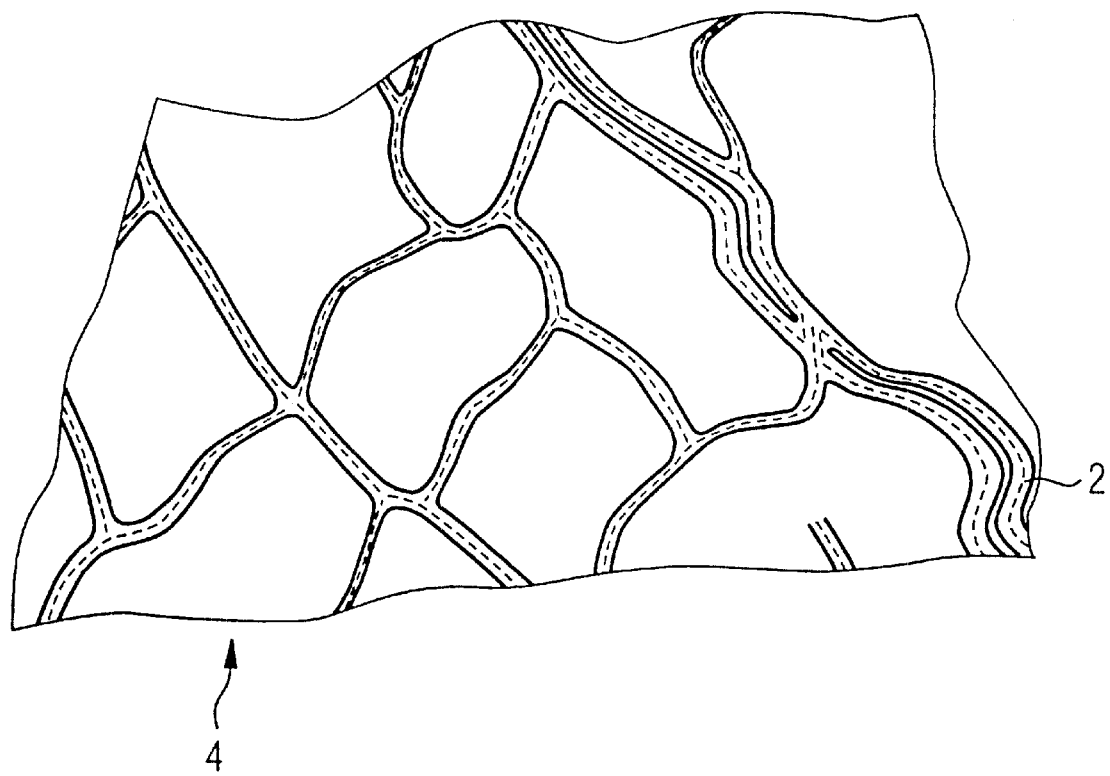
FIG. 4 is an illustration of three-dimensional representation that has been obtained by fusing the data of FIG. 2 and FIG. 3.

FIG. 4 shows the result of combining or fusing the two-dimensional road map data of FIG. 2 with the three-dimensional topological data of FIG. 3.

In order to produce the three-dimensional map representation shown, for each point s, t of the two-dimensional road map database the appropriate point x, y, z from the geotopology database is determined. If no exact counterpart of the point s, t exists for the two-dimensional road map database, the appropriate, three-dimensional topological datum is obtained by interpolating neighboring points of the geotopology database.

The result of the data fusion is a spatial representation that, by contrast with pseudo-three-dimensional methods of representation, yields the real topology of the relevant surroundings. Thus, it is not only individual objects such as prominent mountain ranges or buildings which are represented in three dimensions, but the entire field of view which is offered to the user of the navigation system.

An algorithm for generating a three-dimensional display has two modules.

In a first module, the two-dimensional road map data that are required for an optical representation are converted into a three-dimensional data record.

For this purpose, a loop is firstly formed over all road segments. Road boundary lines are produced inside this loop as polygon edges. The road boundary lines are subjected to a spline interpolation in order to remove corners and edges in the line of the road which occur, for example, on curves.

Subsequently, a loop is formed over all nodes of the two-dimensional road map data. Within this loop, all segments belonging to a node are searched for and sorted. The points of intersection of the road boundary lines are calculated in pairs.

In a further loop over all nodes, the region of the points of intersection between the road boundary lines is subjected to Bézier interpolation. Corners in the case of juxtaposed road segments are eliminated thereby.

A further loop is formed for all road surfaces (polygonal surfaces) thus calculated. The three-dimensional coordinates of all points on the road boundary lines (polygonal boundary lines) are obtained within this loop from the corresponding topological data, where z=f(x, y). Thereafter, the perspectively transformed three-dimensional polygonal surfaces are calculated inside the same loop.

In a second module of the algorithm, the pure geosurface, that is to say the surface structure incorporated by the topological data, is calculated for the image to be represented.

For this purpose, a loop is formed over all three-dimensional surface triangles of the required topology data. Inside this loop, the perspectively transformed three-dimensional triangular surfaces are calculated. These triangular surfaces are placed under the objects to be represented, which is to say the roads and the terrain representation.

The data obtained from the two modules are further processed in a third module. There, all three-dimensional partial surfaces are shown with the aid of a z-buffer (hidden surface) in the appropriate color or texture and with the aid of a suitable source of illumination (shading), in order to generate a complete image of the scene. The z-buffer controls the problem of mutually overlapping surfaces by checking the z-coordinates. The result is that the foremost surface in the direction of view of a viewer is not covered by another surface that is disposed in the region of the same x- and y-coordinates. By contrast with the three-dimensional, topological data, in the case of the screen output the z-axis relates here not to the height of a point but to its assignment in the depth of the space.

Figure 5:
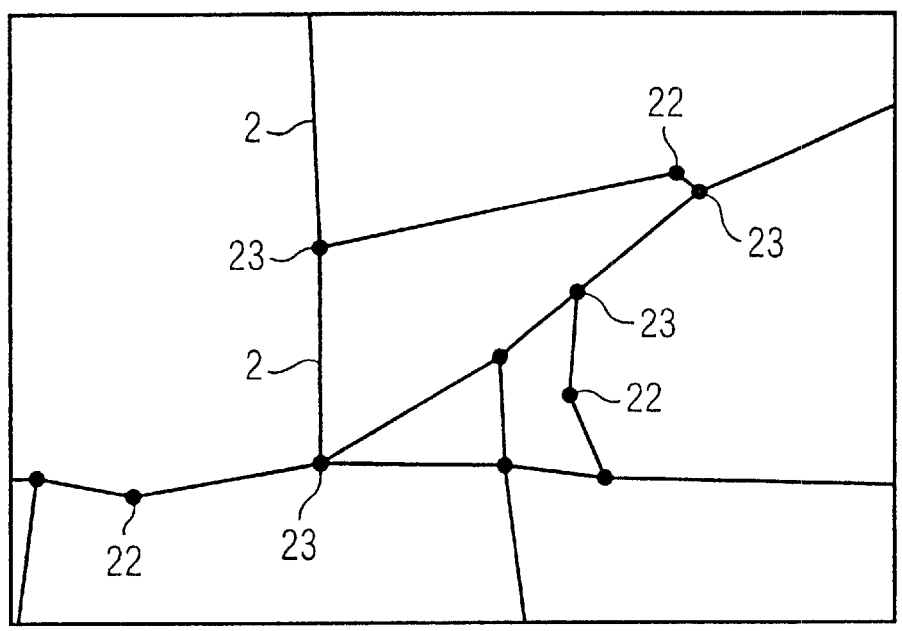
FIG. 5 is an illustration of linear road segments of a two-dimensional road map database.

FIG. 5 illustrates a section of a digital road map that contains two-dimensional road map data with a network of the road segments 2. A plurality of juxtaposed road segments 2 have nodes or points of intersection 23. Curves in the line of the road are fixed by shape points 22.

These two-dimensional road map data are stored on a commercial data medium and constitute the basis for the three-dimensional map representation.

Figure 6:
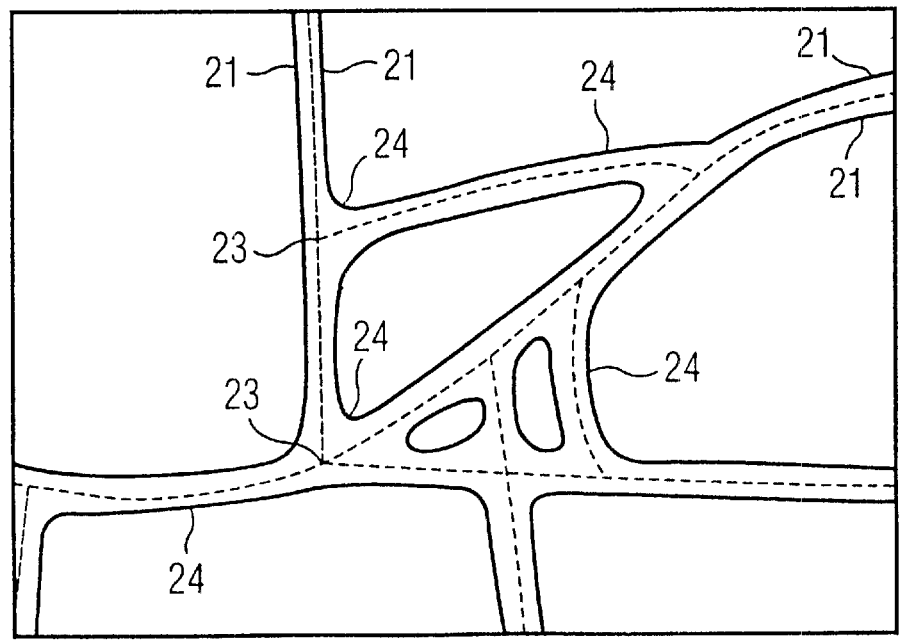
FIG. 6 is an illustration of the road segments shown in FIG. 5 after their conversion into roads with boundary lines and smoothing of the road contours.

FIG. 6 shows the same section of the digital road map after the road segments 2 have been provided by the conversion unit with boundary lines 21. The boundary lines 21 are interpolated nonlinearly or distorted in a region of the juxtaposed segments 2 or of the points of intersection 23. This distortion or bending of the line of the road can be produced, for example, by a Bézier curve or a polynomial interpolation.

The linear or stroke-shaped road segments 2, which are stored in the digital road map, are reproduced as centerlines of the roadways.

By contrast with FIG. 5, at the points of intersection 23 and at the shape points 22 the boundary lines no longer meet one another rectilinearly at a specific angle, but have bends one another or curves 24. The filled surfaces framed by roads are treated in the same way, with the result that the line of the road is smoothed and corners are rounded off.

Figure 7:
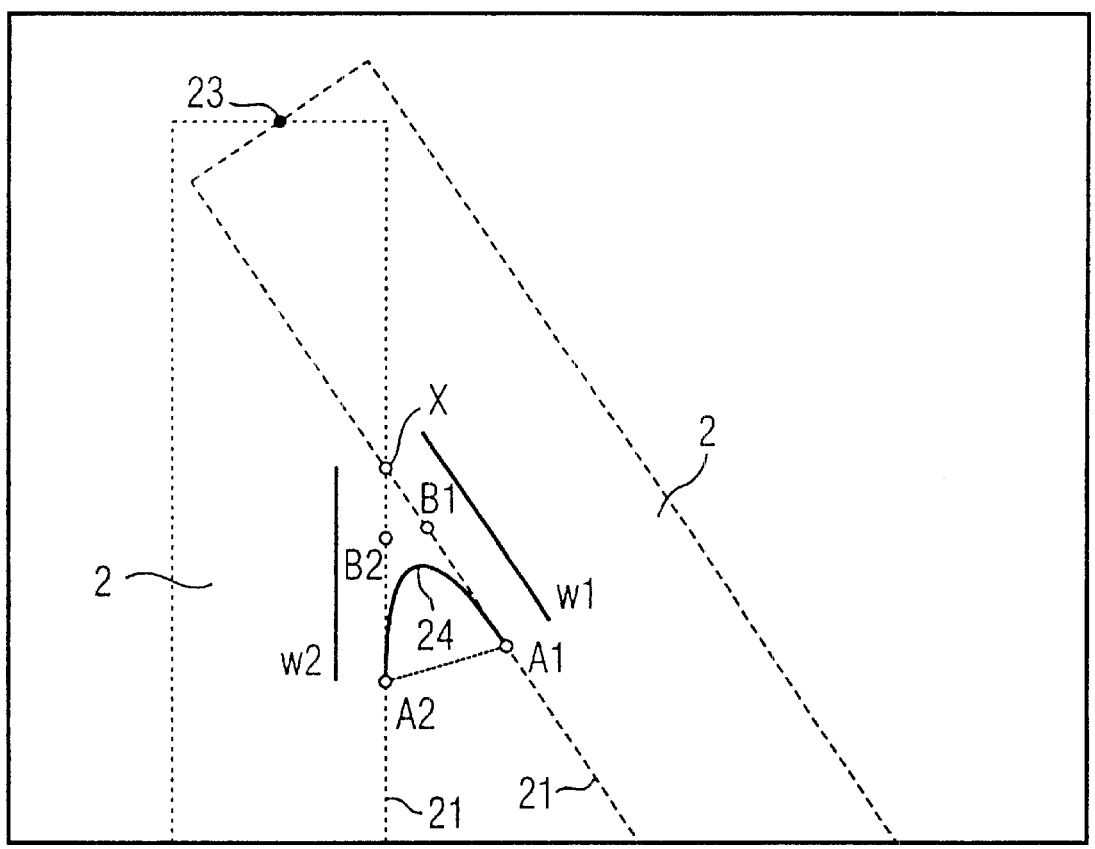
FIG. 7 is an illustration-showing the operation of smoothing the road contours.

FIG. 7 illustrates the smoothing of an angular road contour by use of nonlinear interpolation with the aid of another section from the digital road map. The road segments 2 to be output have been provided again with the boundary lines 21. The juxtaposed road segments 2 therefore acquire cornered contours go at the interfaces X between their boundary lines 21.

In order to avoid this, the boundary lines 21 are smoothed by use of Bézier curves in regions of juxtaposed road segments 2. The representation of the Bézier curves is performed with the aid of the de Casteljau algorithm. The points $b_i^n(t)$ of the Bézier curve are yielded from:

$$b_i^r(t)=(1-t)b^{r-1}_i(t)+tb_{i+1}^{r-1}(1),$$

where $\{r=1, \ldots, n; i=0, \ldots, n-r\}$ are given by the sequence of points $b_i(i=0, \ldots, n)$ as Bézier points of the Bézier polygon. The points $b_i(i=0, \ldots, n)$ are the control points which are prescribed by the geocoordinates of the road segments and define the course of the line, which is to be interpolated, of a boundary line at the points of intersection X. A point on the Bézier curve corresponds to a parameter value $t \in [0 \ldots 1]$.

The points A1, A2, B1 and B2 represented are the control points $b_i$ prescribed by the geocoordinates. More precisely, A1 and A2 are the end points of the Bézier curve represented. B1 and B2 are Bézier construction points. Furthermore, the prescribable parameters w1 and w2 respectively signify distances for determining the positions of the end points A1 and A2, the starting point in each case being the appropriate interface X.

Figure 8:
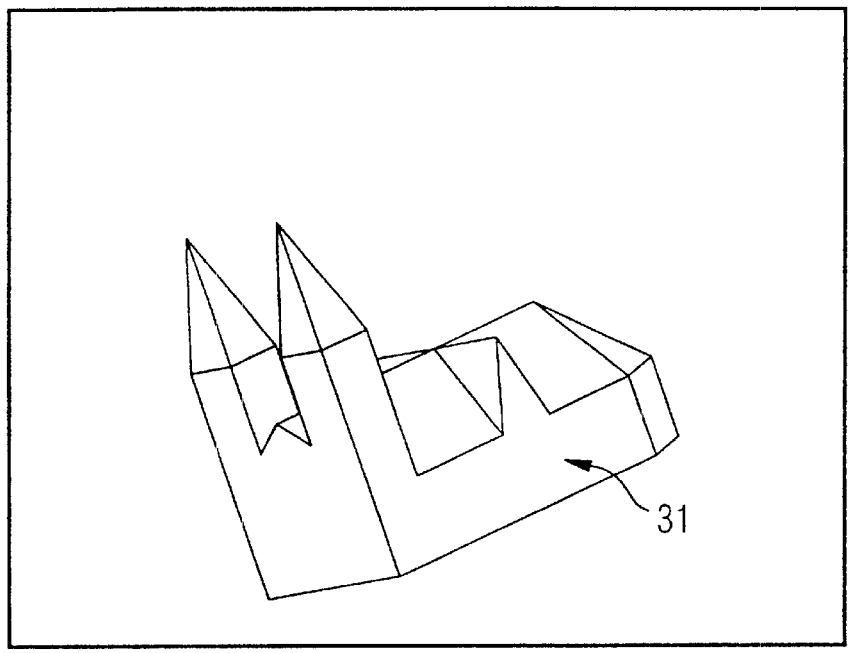
FIG. 8 is an illustration of an object before being fitted with a texture.

FIG. 8 shows a three-dimensional geometrical object 31 that is a church.

Figure 9:
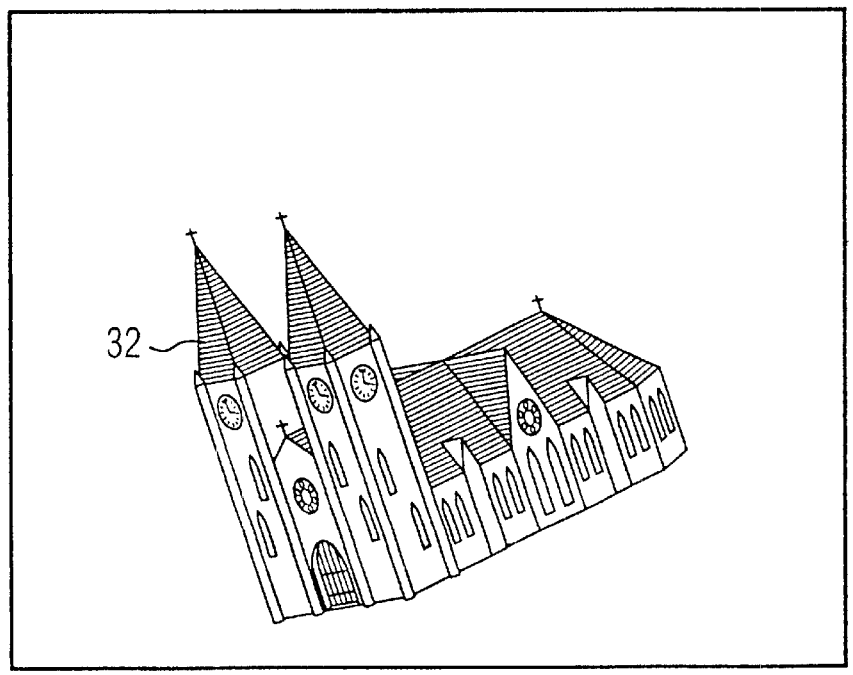
FIG. 9 is an illustration of the object shown in FIG. 8, with texture.

In FIG. 9, the three-dimensional object 31 is provided with a texture 32 that had been obtained by scanning a photograph of the object. The texture contains detailed information on the object such as doors, windows, projections and the like. This detailed information is available in only two dimensions and is not transferred into a three-dimensional structure. Providing the three-dimensionally prepared object 31 with the texture is enough to produce a convincing three-dimensional effect.

Figure 10:
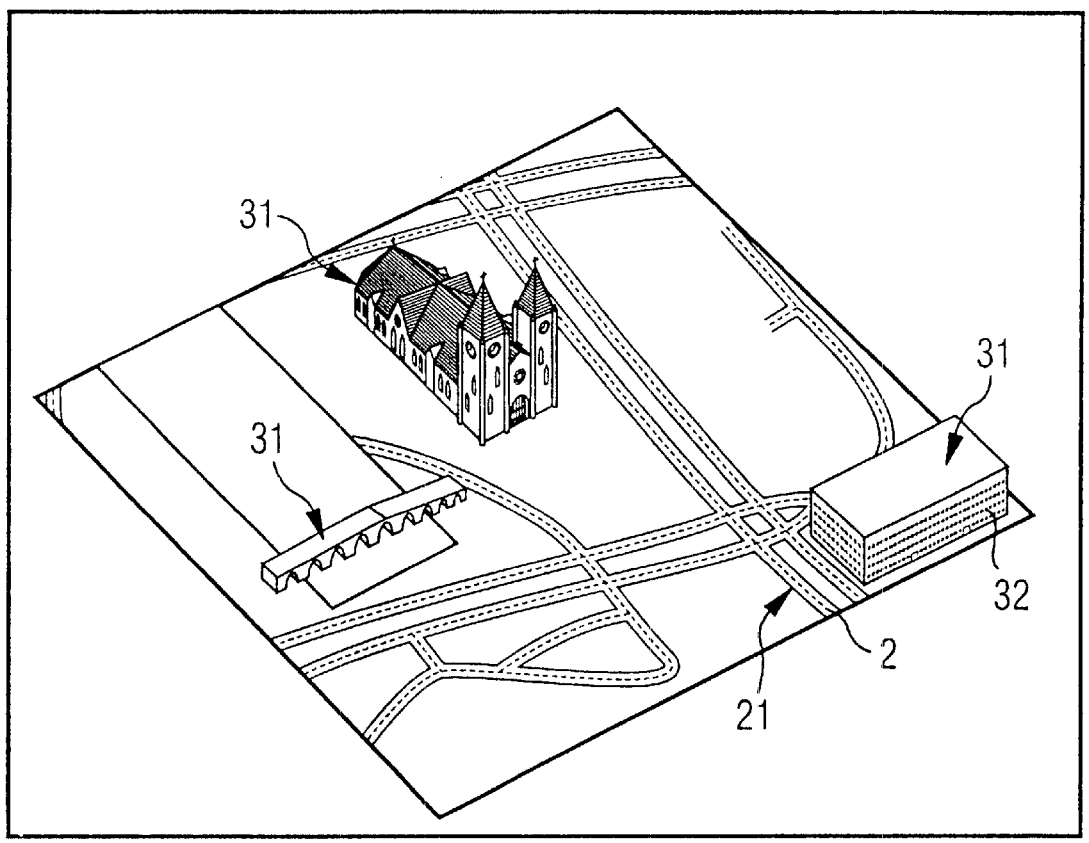
FIG. 10 is an illustration of the object shown in FIG. 9 set in a road map.

FIG. 10 shows a section of a road map to be output after the incorporation of three-dimensional objects 31 and before the transformation of the plane to be represented into a three-dimensional view.

The objects 31 are already provided with the appropriate textures. The road segments 2 are fitted with the boundary lines 21 and with smoothed edges.

Figure 11:
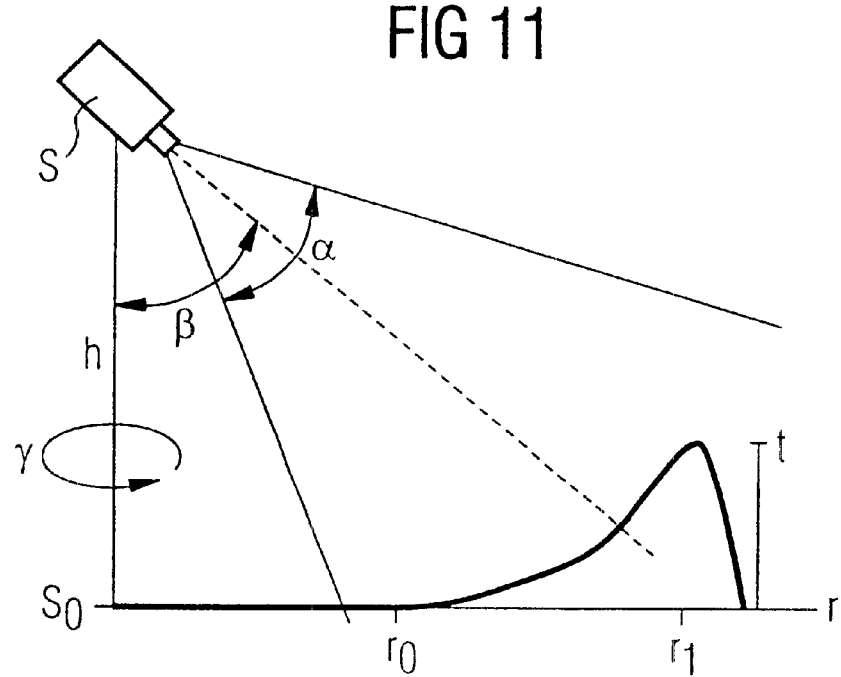
FIG. 11 is an illustration of a virtual viewpoint as a starting point for obtaining a three-dimensional map representation with a limiting horizon.

FIG. 11 illustrates a further type of three-dimensional representation, which is based only on two-dimensional data and dispenses with the addition of three-dimensional topological data. This mode of representation is used, in particular, in downtown areas or in the case of intense enlargement of a section of a road map.

The switchover between the three-dimensional representation, which is based on three-dimensional topological data, and the representation based on two-dimensional data is performed either automatically or as set by the user.

Starting from a measured location or a measured vehicle position $S_0$, the user of the navigation system is offered a map representation up to an artificial horizon of height t, this being done from a virtual viewpoint S which is projected with a height h above the location $S_0$.

An angle of view or a field of view α opens up from the virtual viewpoint S and reaches up to the artificial horizon. The distance $r_1$ up to the horizon, that is to say the visual range, is determined by a camber or curvature of the plane and a start of the camber $r_0$. Only those points from the plane are distorted which are at a distance r from the viewpoint $S_0$ that is between $r_0$ and $r_1$.

The height h of the viewpoint S and an inclination β of the field of view α can be selected arbitrarily. γ denotes a direction of view in the representation. This determines the alignment of the field of view α.

The road map data required for the representation are severely limited by the horizon and the appropriate maximum visual range $r_1$ associated therewith.

A plane with road segments whose midpoint is the viewpoint $S_0$ is bent or distorted in a radially symmetric fashion about the viewpoint $S_0$. A nonlinear interpolation of the two-dimensional plane takes place in the third dimension. A polynomial function serves for the transformation.

A z-coordinate is determined for an arbitrary point with the Cartesian coordinates x, y in the plane, in which case $$z = \Sigma_i a_i * r^i$$

$$r = [(x-x_p)^2 + (y-y_p)^2]^{1/2},$$

the Cartesian coordinates $x_p$ and $y_p$ reproducing the vehicle position $S_0$ determined by the navigation system. $a_i$ are suitable coefficients with $i \in [1 \ldots n]$.

A suitable polynomial transformation defined in a piecewise fashion and of degree p=6 for achieving a three-dimensional representation is reproduced below:

$$r > r_0 : f(r) = -a(r-r_0)^p + c(r-r_0)^2,$$

$$a = \frac{-2t}{(r_1 - r_0)^p (2-p)}$$

$$c = \frac{-pt}{(r_1 - r_0)^2 (2-p)}$$

$$r \leq r_0 : f(r) = 0$$

The color of a point transformed into the third dimension remains unchanged, and the texture, that is to say the representation of the roads, is maintained.

The polynomial transformation causes a representation of the field of view α which is cambered or bent like a dish and has a defined, settable visual range $r_1$. This visual range r corresponds to a horizon that moves synchronously with the change in the viewpoint $S_0$.

Figure 12:
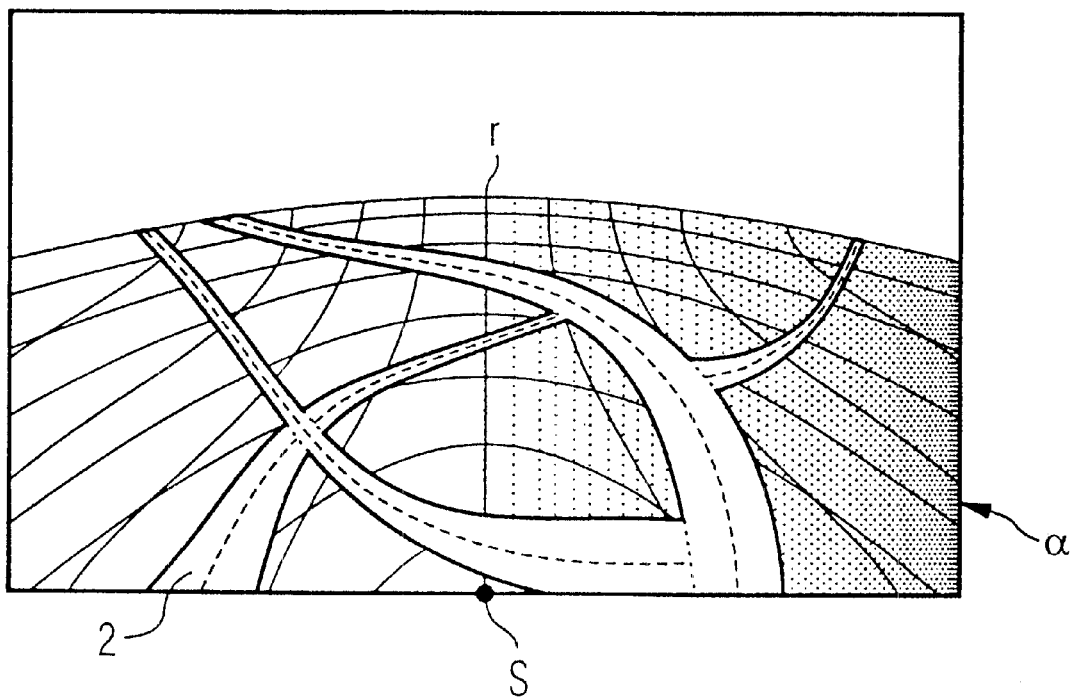
FIG. 12 is an illustration of a field of view resulting for the viewpoint of FIG. 11.

FIG. 12 illustrates the field of view α. Starting from the virtual viewpoint S, the field contains only a subsection or sector of the road map data which are situated around the virtual viewpoint S in a circle with the radius or the visual range $r_1$. The representation is limited to the field of view, situated in the driving direction, which corresponds to the natural way of viewing of a vehicle driver.

In order to make more accurate information on distances and scale available to the viewer of the reproduced field of view α, the field of view is provided with a mesh lattice, starting from the virtual viewpoint up to the visual range $r_1$ or the horizon.

The two-dimensionally represented road segments 2 and the three-dimensional background can be represented in this case by NURBS surfaces which are provided with textures.

In the left-hand part of the field of view α, the road map is reproduced in a distinctly brighter fashion, in order to reproduce the direction of the insolation as a function of the time of day. In addition, the region of the strongest curvature is reproduced most brightly. A particularly realistic three-dimensional view is produced by this illumination as a function of curvature.

I claim:

1. A method for obtaining a three-dimensional map representation for a navigation system, which comprises:

providing a road map database containing two-dimensional map data having a network of road segments represented by points;

interconnecting the road segments by nodes and assigning geocoordinates to the nodes;

providing a separate geotopology database containing three-dimensional topological data;

linking the road segments to be represented with the separate geotopology database;

generating display data by determining associated points of the three-dimensional topological data for the nodes of the road segments to be output; and subsequently outputting the display data onto a display device and plotting the road segments between the determined associated points.

2. The method according to claim 1, which comprises:

connecting the road segments to one another at nodes, the nodes being assigned geocoordinates in the road map database and associated points of the three-dimensional topological data are determined for the nodes of the road segments to be output; and plotting the road segments between the associated points determined in the topological data.

3. The method according to claim 2, which comprises multiplying a coordinate of the associated points, which is responsible for a representation of height, in each case by a factor >1.

4. The method according to claim 2, which comprises assigning textures stored in a texture database and have a raster of the geocoordinates to the three-dimensional topological data.

5. The method according to claim 2, which comprises assigning objects to the three-dimensional topological data in accordance with the geocoordinates as three-dimensional geometrical bodies.

6. The method according to claim 1, which comprises providing the road segments with boundary lines, and distorting the boundary lines into a curved course in a region of juxtaposed road segments.

7. The method according to claim 1, which comprises curving the road map data to be displayed, for a field of view with a predetermined visual range, in a radially symmetric fashion around a virtual viewpoint by using a polynomial transformation in a case of intensive enlargement and in downtown areas.

8. The method according to claim 7, which comprises using the navigation system to continuously determine the virtual viewpoint, and displacing the field of view synchronously with the virtual viewpoint.

9. A navigation system, comprising:

a display device;

a position-determining unit;

at least one storage medium for storing a road map database with two-dimensional road map data of a network of road segments;

a geotopology database containing three-dimensional topological data; and a conversion unit receiving and converting the road segments of said two-dimensional road map database and the three-dimensional topological data of said of geotopology database into a three-dimensional road map representation, said conversion unit connected to said display device for displaying the three-dimensional road map representation.

* * * * *